United States Patent [19]
Jordan

[11] 4,182,967
[45] Jan. 8, 1980

[54] ENERGY STORAGE SYSTEM

[76] Inventor: Robert D. Jordan, 21741 Baywood Ave., Castro Valley, Calif. 94546

[21] Appl. No.: 799,404

[22] Filed: May 23, 1977

[51] Int. Cl.$^2$ .............................................. H02K 7/02
[52] U.S. Cl. .................................... 310/74; 322/4; 308/10
[58] Field of Search .......................... 310/67, 74, 105; 308/10; 322/4

[56] References Cited

U.S. PATENT DOCUMENTS

| | | | |
|---|---|---|---|
| 2,147,381 | 2/1939 | List et al. | 322/4 |
| 2,301,424 | 11/1942 | List et al. | 322/4 |
| 2,394,316 | 2/1946 | List | 322/4 X |
| 3,436,572 | 4/1969 | Storsand | 310/74 |
| 3,518,469 | 6/1970 | Storsand | 310/74 |
| 3,526,795 | 9/1970 | Pecs | 310/74 |
| 3,609,426 | 9/1971 | Gaul | 310/74 X |
| 3,619,679 | 11/1971 | Carmichael | 310/67 |
| 3,683,216 | 8/1972 | Post | 310/67 |
| 3,902,659 | 9/1975 | Brinkmann et al. | 310/105 X |
| 3,970,917 | 7/1976 | Diggs | 310/74 X |
| 4,035,659 | 7/1977 | Jeppson | 310/74 X |

Primary Examiner—Donovan F. Duggan
Attorney, Agent, or Firm—R. S. Sciascia; Charles D. B. Curry; Francis I. Gray

[57] ABSTRACT

An energy storage system particularly adapted for mobile x-ray units which uses electrical energy from an ordinary 110 volt wall outlet, stores it as mechanical energy, and then converts part of the mechanical energy back to electrical energy in a short period of time. The mechanical energy is stored in flywheels which are also parts of a generator which converts mechanical to electrical energy as required.

4 Claims, 4 Drawing Figures

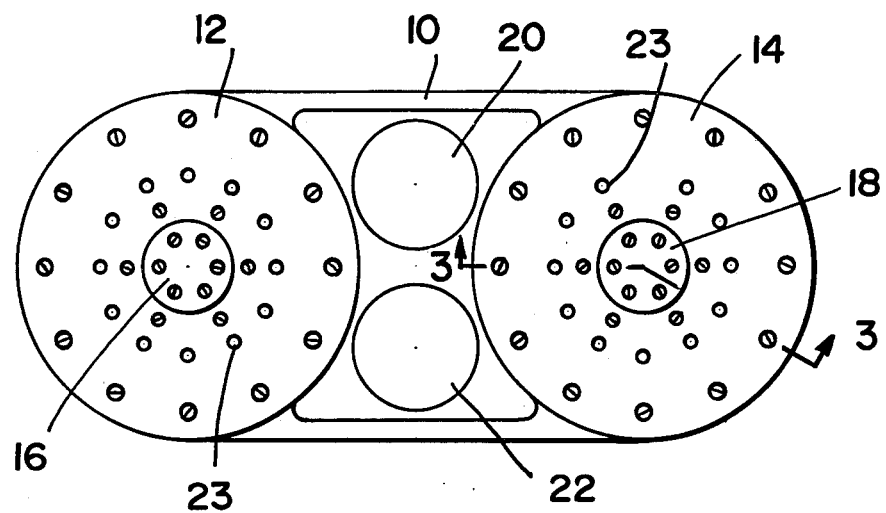
FIG_1
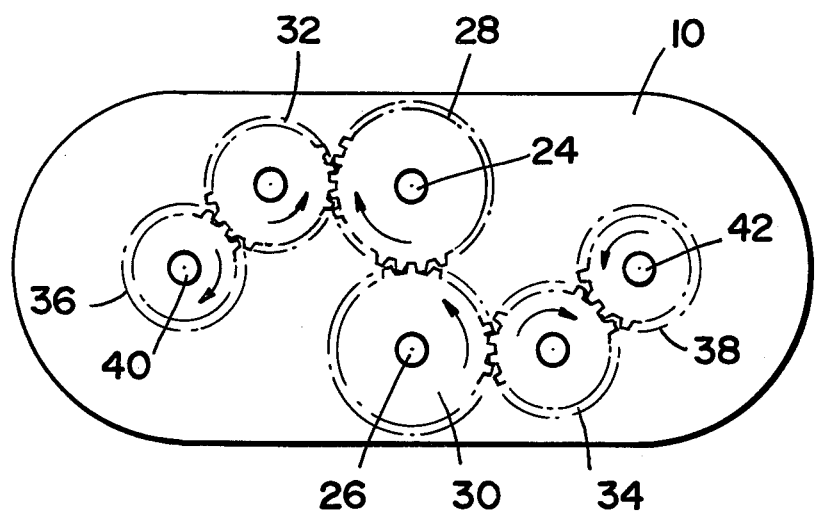
FIG_2

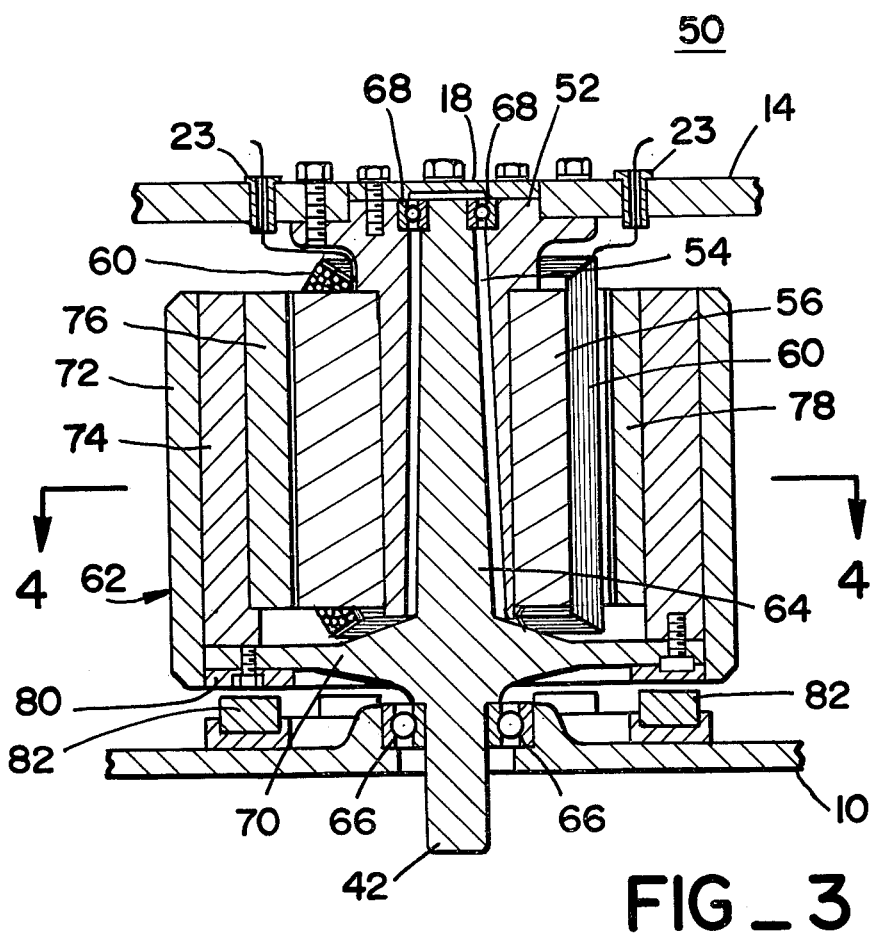
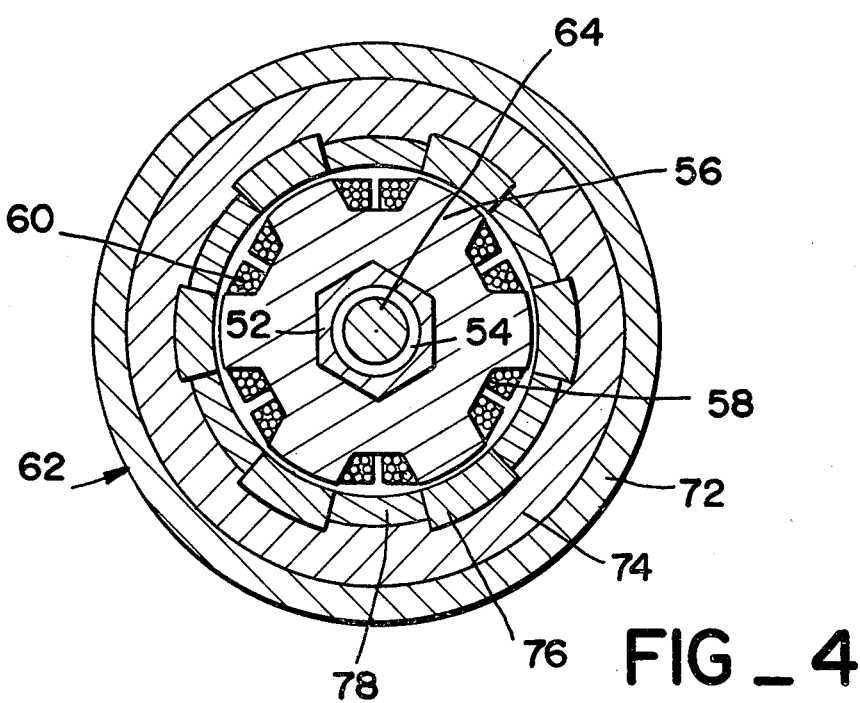

ENERGY STORAGE SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to energy storage systems, and more particularly to an energy storage system which stores electrical as mechanical energy and converts the mechanical energy to electrical energy as required.

2. Description of the Prior Art

To avoid motion artifacts (blurring due to motion of the patient) x-ray exposures should be as short as possible. The x-ray flux required to properly expose a film is fixed. Therefore, the intensity during short exposures must be very high. To obtain these high intensities the x-ray unit must have adequate electrical power during the exposure. A stationary x-ray unit with maximum ratings of 125 Kilovolts (peak) and 300 milliamps at 100 Kilovolts (peak) is considered a low-powered unit. Even these low-power units require an electrical supply with a capacity of over 20 Kilowatts. In most practical applications a 30 Kilowatt capacity would actually be provided for the unit.

The output ratings of even the most powerful mobile x-ray units are generally much less than those of relatively low-power stationary units. This is due primarily to the great expense involved in providing a large number of high capacity electrical outlets throughout a hospital. Other power sources are used in existing mobile units, but each of them has certain disadvantages that limit the practical output levels that can be achieved.

Most, if not all, existing mobile x-ray units fall into one of the three following general types:

(1) Wall outlet powered;
(2) Battery powered; and
(3) Capacitor discharge.

The wall outlet powered units are very similar to conventional stationary units. They consist of an integrated generator, tubestand and tube all mounted on a wheeled base. A power cord from the generator is plugged into a wall outlet to obtain electric power for the unit. These units have good outputs for their size and weight, but they are limited by the capacity of the outlet, high capacity outlets being very expensive. Usually only a few high capacity outlets are available in most hospitals, usually restricted to areas such as operating and emergency rooms.

Battery powered machines use a power cord only while the batteries are being recharged, usually at night, and require only a one Kilowatt outlet. They also provide emergency x-ray capability during power failures. However, several hundred pounds of batteries are required to obtain moderate x-ray outputs, the weight requirement being imposed by the basic properties of batteries. Also the batteries cannot be rapidly charged without damaging them, and their rate of discharge is limited by internal resistance.

Capacitor discharge units are severely limited by the amount of energy that can be stored in a capacitor of reasonable size and weight. The capacitor is initially charged to some value of high voltage, and then discharged through the x-ray tube. This produces a decrease in tube potential during the exposure. To obtain even very low exposures the voltage must be dropped by an appreciable amount, severely limiting the applications of these units.

SUMMARY OF THE INVENTION

Accordingly, the present invention provides a means for using electrical energy from an ordinary 110 volt wall outlet and storing it as mechanical energy. The energy is stored as kinetic energy in two flywheels driven by electric motors operating from the wall outlet. The flywheels form part of a generator which converts the kinetic energy to electrical energy as required. The flywheels are vertical and counter rotating to prevent rotational forces on an x-ray unit. Gears connect the flywheels and motors together to assure equal angular velocities and accelerations in opposite directions.

Therefore, it is an object of the present invention to provide high power electrical energy for the operation of mobile x-ray units.

Another object of the present invention is to provide a high power electrical storage system which can be charged quickly from a standard wall outlet.

Yet a further object of the present invention is to provide a high power electrical storage system with a capacity equivalent to an electrical power supply for a stationary x-ray unit.

Still another object of the present invention is to provide an electrical power supply which is lightweight and relatively compact.

A further object of the present invention is to provide an electrical storage system which stores electrical energy as mechanical energy, and discharges the mechanical energy as electrical energy at a fairly constant voltage level.

Other objects and advantages of the present invention are apparent from the following detailed specification and drawing.

BRIEF DESCRIPTION OF THE DRAWING

FIG. 1 is a top plan view of an energy storage system.

FIG. 2 is a bottom plan view of an energy storage system.

FIG. 3 is a cross-sectional view of part of an energy storage system taken along the line 3—3 of FIG. 1.

FIG. 4 is a cross-sectional view of part of an energy storage system taken along the line 4—4 of FIG. 3.

DESCRIPTION OF THE PREFERRED EMBODIMENT

Referring now to FIG. 1 a two flywheel electrical energy system is shown. A case 10 encloses the components of the system, the details of which are not shown since there are many practical configurations. Stator covers 12, 14 and rotor covers 16, 18 are attached to the case 10 by any suitable means to form an enclosure within which the flywheel-generator assemblies are contained. Also mounted on the case 10 are two motors 20, 22, one for each flywheel-generator assembly. The motors 20, 22 operate from a low power source such as an ordinary 110 volt wall outlet, and are preferably universal motors due to their high power-to-weight ratios and high rotational velocities.

FIG. 2 shows the gear arrangement for connecting motors 20, 22 to their respective flywheel-generator assemblies and to each other to insure that the flywheels and motors have angular velocities and accelerations that are of the same magnitude but opposite in direction. Thus, the torques generated are transmitted by the case from one flywheel to the other during accelerations and deceleration for a zero net torque on the system. Motor shafts 24, 26 are parallel to each other and are connected to each other by motor gears 28, 30. The torque from the motors 20, 22 is transmitted via the motor gears 28, 30 through intermediate idler gears 32, 34 to flywheel gears 36, 38. The flywheel gears 36, 38 are mounted on parallel vertical flywheel shafts 40, 42. As indicated by the arrows the gear arrangement necessitates that the flywheels rotate opposite to each with equal angular velocity and acceleration. The motor gears 28, 30 can be disconnected by clutches from the motors to allow the flywheels to coast between uses of the x-ray unit supplied by the energy storage system.

A single flywheel-generator assembly 50 is depicted in cross-section in FIGS. 3 and 4. A stator support 52, essentially cylindrical in shape, is attached to the stator cover 14 which is attached to the case 10 (shown in FIG. 1), and has a central cavity 54. A laminated steel core 56 is mounted on the outside of the stator support 52 and has axial notches 58 evenly spaced around its circumference. The core 56 is bonded to the stator support 52 by any suitable high strength adhesive such as epoxy. Coils 60 are mounted on the core 56, lie within the space formed by the axial notches 58, and terminate at terminals 23. The coils 60 are insulated from the laminated steel core 56, have insulated windings, and are potted in high strength plastic with the spaces between the coils filled to provide a strong and rigid assembly. This strength and rigidity of the coils 60, laminated steel core 56, stator support 52, stator cover 14 and case 10 are required to resist the forces that will occur when energy is removed from the flywheel-generator assembly 50 at high power levels as described infra.

A flywheel 62 in the shape of concentric cylinders has a rotor shaft 64, one end of which is supported by bearings 66 mounted in the case 10 and extends outside the case to form the flywheel shaft 42, and the other end of which extends into the central cavity 54 of the stator support 52 and is supported by bearings 68 mounted in the stator support. At the base of the rotor shaft 64 within the case 10 a ring extension 70 in the form of a concentric disk connects the rotor shaft with the remainder of the flywheel 62 which is situated external to the stator support 52. A high tensile strength steel cylindrical ring 72 forms the outer layer of the flywheel 62 and is bonded by any suitable means to a high permeability iron cylindrical ring 74 which is mounted on the ring extension 70. A plurality of permanent magnets 76 are situated axially in slots in the iron ring 74, the magnets being equal in number to the coils 60. A filler material 78 fills the space between adjacent magnets 76 to form a smooth cylindrical surface in close proximity to the laminated core 56. A silver-plated copper ring 80 is mounted to the underside of the ring extension 70 at the outer perimeter.

A plurality of permanent magnets 82 are mounted on the interior of the case 10 under the silver-plated copper ring 80 to provide a repulsive force at high r.p.m. to support the weight of the flywheel 62 and thus remove most of the thrust load from the bearings 66. The permanent magnets 82 are cylindrical with their magnetic fields parallel to the axis of the cylinder. When the silver-plated copper ring 80 is stationary there will be a slight attractive force between the permanent magnets 82 and the magnetic materials in the flywheel 62, which force is small due to the distance between the magnets and the flywheel. When the silver-plated copper ring 80 is in motion relative to the permanent magnets 82 electromotive forces (EMF's) will be induced in the ring to produce currents which by Lenz's Law produce magnetic fields to oppose those of the permanent magnets, i.e., there will be a repulsive force between the permanent magnets and the ring. At low r.p.m. the induced currents produced by each of the magnets 82 will be in both the copper and silver of the ring 80. As the r.p.m. increases the current will move to the surface of the ring 80 and at moderate to high r.p.m. the current will be in the silver plating. The repulsive force will reach a saturation value at some intermediate r.p.m. and remain nearly constant as the r.p.m. increases, providing the thrust load relief for the bearings 66 for all moderate to high r.p.m. The ring 80 is silver-plated since silver has the highest electrical and thermal conductivities of all metals at room temperature.

The polarities of permanent magnets 76 alternate around the flywheel 62 to produce magnetic circuits with relatively low reluctance, and to produce high rates of change of flux through the coils 60. When the flywheel 62 rotates at 18,000 r.p.m. (300 Hz), a flywheel-generator assembly 50 with six permanent magnets 76 and six coils 60 produces 900 Hz alternating current. For a flywheel-generator assembly with a 10 cm in diameter by 10 cm high stator and permanent magnets 76 with flux densities of approximately 12,000 gauss, a storage capacity of 150 Kilojoules (300 Kilojoules for the two flywheel system) is obtainable to generate about 480 peak volts at 10 amperes in each coil 60, or approximately 4 Kilowatts per coil (48 Kilowatts for the two flywheel system). This is equivalent to the power required for a high powered stationary x-ray unit, i.e., 480 volts at 100 amperes.

Thus, the present invention provides a source of high power electrical energy that matches the power and energy requirements of mobile x-ray units, is relatively small, compact and lightweight compared to existing units, and can be operated directly from a low power source with a relatively short energy storage time.

What is claimed is:
1. An energy storage system comprising:
 (a) a case;
 (b) a motor having a vertical spindle extending therefrom, said motor converting a low power source of electrical energy into mechanical energy, said motor mounted in said case and detachably connected to said low power source;
 (c) a cylindrical flywheel for storing said mechanical energy rotatably mounted in said case having a central vertical shaft about which said flywheel operates and a ring extension rigidly connecting said shaft to said flywheel, said flywheel having laminate construction of a plurality of concentric cylinders;
 (d) a gear system for transferring rotary motion of said spindle into rotary motion of said flywheel about said shaft whereby an idler gear is disengagably connected between a motor gear mounted on said spindle and a flywheel gear mounted upon an extension of said shaft, said motor gear disengagably connected with said motor; and

(e) means for rapidly discharging said mechanical energy as high power electrical energy, said high power electrical discharge having very short time duration and constant voltage such that many such discharges occur before significant degradation of said stored mechanical energy occurs.

2. An energy storage system as recited in claim 1 wherein said discharging means comprises:
   (a) a cylindrical stator mounted on said case and situated about said shaft within said flywheel so that said flywheel rotates freely around said stator, said stator having a plurality of longitudinal slots on the outer surface thereof;
   (b) a plurality of electrical windings situated in said slots; and
   (c) a plurality of permanent magnets, each of said magnets being opposite in polarity to each adjacent magnet, mounted in and flush with the inner surface of said flywheel so that an electrical voltage is included in said windings when said flywheel rotates about said stator.

3. An energy storage system as recited in claim 2 further comprising means for levitating said flywheel so that rotation wear between said shaft and said case is minimal.

4. An energy storage system as recited in claim 3 wherein said levitating means comprises:
   (a) a silver-plated copper ring mounted on the underside of said ring extension adjacent the periphery thereof; and
   (b) a plurality of permanent magnets mounted on the interior of said case directly under said silver-plated copper ring such that when said flywheel rotates electric currents are induced in said ring to produce repulsive forces between said ring and said permanent magnets mounted on said case sufficient to levitate said flywheel from said case in the direction of the longitudinal axis of said flywheel.

* * * * *